Figure 1:
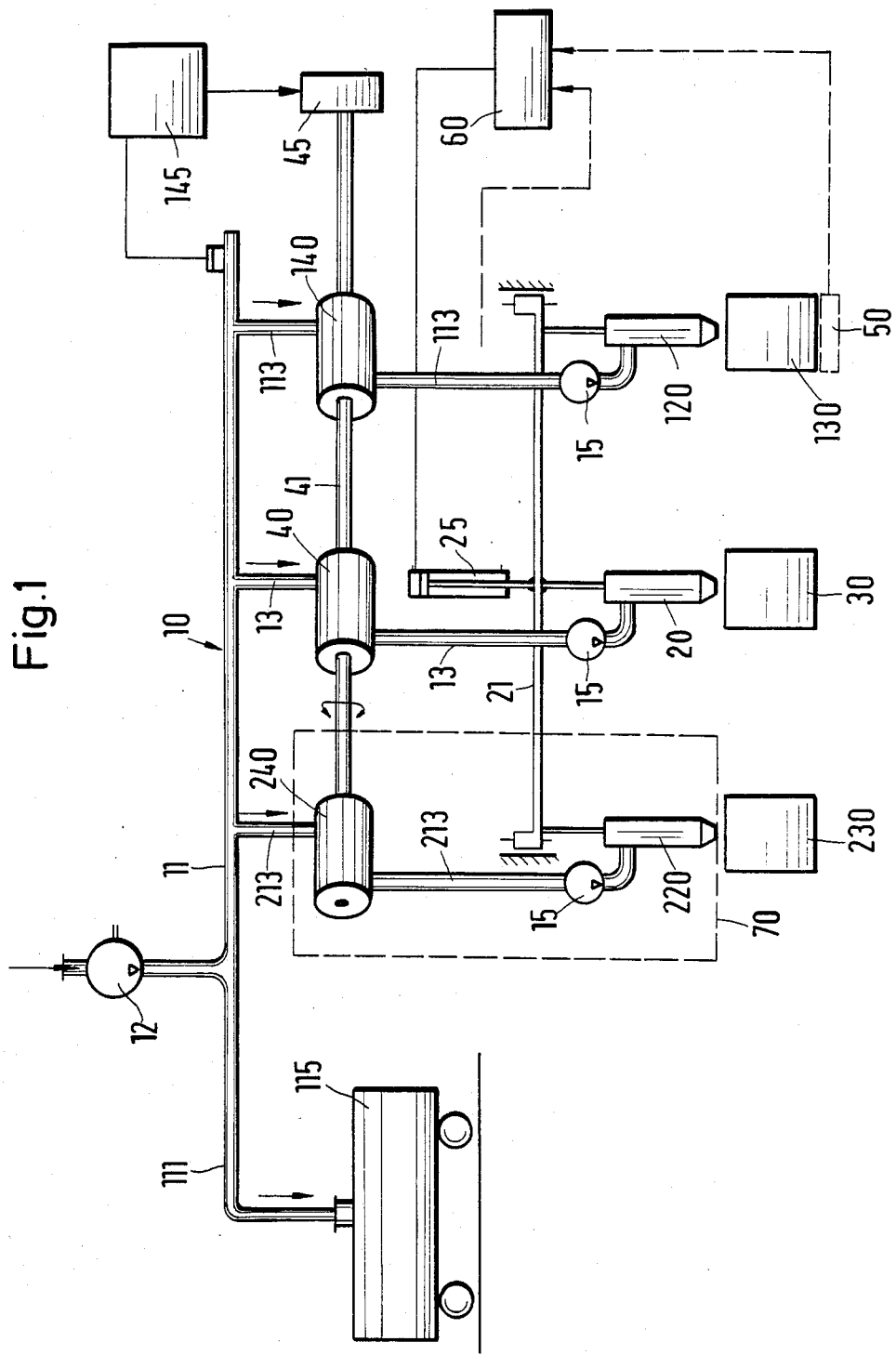

United States Patent [19]

Grosskreuz et al.

[11] Patent Number: 4,651,788

[45] Date of Patent: Mar. 24, 1987

[54] APPARATUS FOR SIMULTANEOUSLY FILLING A PLURALITY OF CONTAINERS WITH LIQUID, GASEOUS OR SOLID SUBSTANCES

[76] Inventors: Gerhard Grosskreuz, Volksdorfer Weg 174, 2000 Hamburg 65; Edith Kleinophorst, Kronprinzenstr. 9, 4130 Moers 1, both of Fed. Rep. of Germany

[21] Appl. No.: 747,128

[22] PCT Filed: Oct. 12, 1984

[86] PCT No.: PCT/DE84/00212

§ 371 Date: Jun. 12, 1985

§ 102(e) Date: Jun. 12, 1985

[30] Foreign Application Priority Data

Oct. 14, 1983 [DE] Fed. Rep. of Germany ....... 3337352

[51] Int. Cl.$^4$ ................................................ B65B 3/32
[52] U.S. Cl. ......................................... 141/83; 141/192; 141/242; 177/50; 222/14; 222/274; 222/485
[58] Field of Search ........................................ 141/1–12, 141/250–284, 83, 234–248, 94, 95, 96, 192–229; 222/273, 274, 14, 489; 177/50

[56] References Cited

U.S. PATENT DOCUMENTS 3,548,891 12/1970 Hull ........................................... 141/7

4,523,616 6/1985 Kleinophurst et al. ............... 141/83

FOREIGN PATENT DOCUMENTS 0105197 4/1984 European Pat. Off. .
2728759 1/1979 Fed. Rep. of Germany .
3022413 1/1982 Fed. Rep. of Germany .

Primary Examiner—Houston S. Bell, Jr.
Attorney, Agent, or Firm—Toren McGeady Goldberg

[57] ABSTRACT

In order to be able to simultaneously fill with a liquid, gaseous or solid flowable medium, without it being necessary to measure and monitor the filling volume or weight of each container, the filling plant has a pipeline system (10) for conveying the medium to be filled with a plurality of drawing-off lines (13, 113, 213) leading to the filling valves (20, 120, 220) and in which are arranged volume chambers (40, 140, 240) with rotors rotated by the medium flowing through the same, arranged jointly on a shaft (40) with a system pressure-dependent controlled brake (45). A balance (50) is only associated with a single filling valve (20) of the valves controlled by a control cylinder (25) and is used for controlling said cylinder (25). A feed pump (15) connected upstream of the filling valve (120) associated with balance (50) ensure a uniform exit velocity of the medium in the container when pressure fluctuations occur in the pipeline system (11, 13, 113, 213).

5 Claims, 2 Drawing Figures

APPARATUS FOR SIMULTANEOUSLY FILLING A PLURALITY OF CONTAINERS WITH LIQUID, GASEOUS OR SOLID SUBSTANCES

FIELD OF USE

The plant according to the invention can be used wherever liquid, gaseous or solid flowable media are to be simultaneously filled into several containers.

PRIOR ART

Filling systems are known for filling liquid, gaseous or flowable products, which are constructed in such a way that even in the case of the simultaneous filling of several containers the in each case necessary quantity of material to be filled is individually fixed. Such a filling system requires a number of devices corresponding to the number of individual filling devices enabling the filling volume or weight of each container to be measured and monitored.

U.S. Pat. No. 3,548,891 discloses a plant for the simultaneous filling of several containers, but using a number of dosing and filling devices corresponding to the number of containers to be filled, an individual filling device being associated with each container to be filled. The filling connections of the filling device permits the filling of individual containers in accordance with the filling volume. However, this plant does not provide for the measurement and monitoring of the filling volume or weight of only a single container, the filling of the other containers being controlled on the basis of the monitoring of said one container.

U.S. Pat. No. 3,205,920 has a filling apparatus with an association of a volume chamber and the coupling of valve actuation.

In the filling apparatus according to Swiss Pat. No. 174,324 a weight-dependent control member is provided, which functions in such a way that the further supply of medium to be filled is interrupted when the in each case given weight is reached. On reaching the desired weight, the further supply of filling medium is stopped. This filling apparatus does not provide for the control of a plurality of filling valves via a single weight-controlled device.

PROBLEM, SOLUTION, ADVANTAGES

The present invention is intended to provide an economic filling system enabling the simultaneous filling of several containers, it being necessary only to measure and monitor the filling volume or weight of one container, which leads to a simple economic filling system, whose operating efficiency can be increased in the simplest possible way at any time and without significant technical expenditure and in which by switching in or out of a drawing-off line connected to the filling system and leading to a further consuming means, such as a tanker or the like, pressure surges occurring in the supply lines are reduced for preventing incorrect measurement results. In addition, a filling system is to be provided enabling several containers to be simultaneously filled, in which the filling volume or weight of only one container is measured and then need be used for controlling the inflow of further medium, so that by means of comparative measurements of flow rates, it is possible to control the filling volume or weight for the other containers. This leads to a simple, economic filling system with a high operating efficiency and without significant technical expenditure. It is only necessary to compare the flow rates to the individual containers with a stored desired value and which permits the control of the further medium supply quantity. It can be housed in several areas, if the single area available cannot receive the complete apparatus with several filling stations. By switching in or out a drawing-off line connected to the filling system and leading to a further consuming means, such as tankers or the like, pressure surges occurring in the supply lines can be reduced to prevent incorrect measurement results.

According to the invention, this problem is solved by a filling plant, which is constructed in such a way that (a) each of the supply lines leading to the filling valves contains a volume chamber with a rotor arranged in its inner area and which is rotated by the medium flowing to the particular filling valve, (b) the rotors of all the volume chambers are rigidly interconnected by means of a mechanical shaft, which is connected by a brake controllable by means of a system pressure-dependent control device, (c) for controlling the filling valves, a two-stage pneumatic control cylinder is provided, which is directly connected to at least one filling valve and is connected via an adjusting device to the further filling valve, (d) a control element connected to the control cylinder is provided and responds to the weight of the filled medium via a balance associated with one of the filling valves, (e) the main supply line is provided with a further drawing-off line leading to a consuming means, and (f) a feed pump is placed upstream of the filling valve in the supply line leading to the filling valve with the associated balance.

Such a construction leads to a calibratable filling plant enabling several containers to be simultaneously filled, only the filling volume or weight of one container being measured and monitored. It is ensured that the remaining containers not monitored by a balance are also filled within the scope of the permitted tolerances with the desired weight or volume of the medium. This is achieved in that the rotors or impellers of the volume chambers are centrally driven via a shaft by the medium flowing to the filling valves, so that by means of a system pressure-dependent brake, the rotational speed of the shaft interconnecting the rotors of the volume chambers is controlled, so that finally the same pressure ratios prevail in all the volume chambers, so that the medium to be filled is supplied to the filling valves with the same pressure. Through the use of a single balance as the control means, the filling valves are controlled and simultaneously opened or closed. The closing of the filling valves takes place simultaneously on reaching the given desired value on the balance.

The following advantages result from this filling plant. Only one container is weighed or volumetrically monitored by a rotary piston meter. The filling tolerance of all further filling valves is merely dependent on the accuracy of the mechanically coupled volume chambers. As the accuracy of the mechanically coupled volume chambers is very high, no or scarcely no filling tolerances influencing the final weight are obtained. An existing filling plant can be extended without any significant technical expenditure at any time. Pressure waves and fluctuations in the pipeline system of the plant do not influence the filling tolerance. By coupling the volume chambers by means of a rigid shaft and through the synchronous operation of the filling valves by an adjusting mechanism, the calibratability condition is fulfilled.

DEVELOPMENT OF THE INVENTION

According to the further development of the invention according to claim 2, the filling plant comprises:

(a) a pipeline system with a feed pump for supplying the medium to be filled, (b) at least two filling valves connected to the pipeline system via supply lines, (c) a volume chamber arranged in the supply line and connected upstream of each filling valve and having in its inner area a rotor with a bearing shaft caused to rotate by the medium flowing to the filling valve, (d) a control element responding to the weight of the filled medium via a balance associated with one of the filling valves and which is connected to a two-stage control cylinder, which is directly connected to the filling valve, (e) pneumatic two-stage control cylinders connected to the filling valves, (f) flow rate recording devices connected to the volume chambers, whereof the flow rate according device of the volume chambers with the filling valve controlled by the balance is connected to a device storing as a desired value the quantity of through-flown medium determined on switching off the medium supply to the filling valve and which is detected by the flow rate recording device, whereby in said device the flow rate recording devices of the other volume chambers are brought together and in which the desired values of the flow rate recording device is compared with the actual values of the other flow rate recording devices for controlling the remaining filling valves and on reaching the desired values for the volume chambers the filling valves associated therewith are switched off, (g) the main supply line is provided with a further drawing-off line leading to a consuming means, and (h) a feed pump is arranged in the supply line leading to the filling device with the associated balance, so as to be positioned upstream of the valve.

. On the basis of such a construction, once again a calibratable filling system is obtained enabling several containers to be simultaneously filled. Only the filling volume or weight of a single container is measured or monitored and the flow rate to the filling station of a single container controlled by the balance is stored. The thus determined desired value is compared with the recorded and stored flow rate values of the remaining filling stations with the further containers. On the basis of these comparative measurements, the control of the further inflow or the disconnection of the medium inflow to the further filling stations with the containers is brought about. It is ensured that the remaining containers are monitored by a balance and also filled within the scope of the minimum tolerances with the desired medium weight or volume. This is achieved in that by means of a single balance via a control element only one of the filling valves is closed. The medium quantity which has flown through the volume chamber to said closed filling valve is maintained in the associated flow rate recording device until the filling valve is closed and the thus obtained flow rate value is fed into the memory as a desired value. Simultaneously, the flow rate values obtained by the flow rate recording devices of the other volume chambers are supplied to the memory. The memory then compares the actual values of the values determined by the flow rate recording devices and the stored flow rate value (desired value) of the flow rate recording device, whose associated filling valve is controlled by the balance. In the case of coincidence of the actual values of the other flow rate recording devices and the desired value, the remaining filling valves are closed, so that the same medium quantity is obtained in all the containers. As the measured value comparison takes place in the memory in a minimum amount of time, so that there is no time lag, it is ensured that on closing the filling valves the same medium quantity is in fact obtained in all containers. This comparative measurement in the memory ensures that in the case of those filling stations where the given desired weight has not been reached in the container to be filled, filling material continues to flow in until the predetermined desired weight is reached and only then is the associated valve closed.

A filling plant constructed in this way leads to the following advantages.

Only a single container is weighed or volumetrically monitored by a rotary piston meter, the flow rate through the associated volume chamber being stored as a desired value.

The filling tolerance of all the further filling valves is solely dependent on the speed of the comparative measurements of the flow rate values in the memory for the remaining filling stations and if the desired value is not reached, the missing quantity of filling material flows in until the desired value is reached and only then do the filling valves of the corresponding filling systems close. Accuracy is very high due to the comparative measurements of the flow rate values and the control via said comparative measurements.

Due to the fact that the filling valves of all the filling stations not connected to the balance are controlled separately from the memory, it is ensured that none of the filling tolerances influencing the final weight are obtained, so that it is possible for all the containers to have the same quantities or weights.

Due to the fact that the volume chambers are no longer mechanically interconnected, it is possible to house individual volume chambers or chambers combined into individual groups brought together with their filling valves in separate areas, if the available area is not sufficient for housing the complete plant.

Pressure waves and fluctuations in the pipeline system do not influence the filling tolerance and are taken into consideration as a result of the comparative measurements in the memory.

Due to the fact that a further feed pump is provided in those supply lines containing filling valves associated with a balance, pressure surges occurring in the pipeline system are reduced. It has been found that in all cases in which the main supply line is connected to a further drawing-off line, by means of which a further consuming means, such as a tanker or the like is to be supplied during the filling of the medium into the container, pressure surges occur in the supply lines leading to the volume chambers and these have a disadvantageous effect on the measured results of the balance, in that in the case of a sudden interruption of the medium supplied to the further consuming means, there is a pressure build-up in the supply lines, so that suddenly and in particular in surge-like manner medium is supplied to the container on the balance. As a result of this sudden change in the medium supply, the balance gives false measurement results or supply such results to the control means, so that the container does not contain the given final filled medium weight. Through the arrangement of a feed pump upstream of the filling valve associated with the balance, a uniform supply of medium to the filling valve is ensured, so that the given final weights are accurately respected. Increased exit velocities are avoided, because the upstream-connected feed pump ensures the maintaining of uniform exit velocities, even if pressure fluctuations should occur in the supply line from the feed pump.

Embodiments are described hereinafter relative to the drawings:

FIG. 1 diagrammatically shows a filling apparatus for the simultaneous filling of a medium into several containers with volume chambers, whose rotors are interconnected by means of a common control shaft controlled by a balance.

Figure 2:
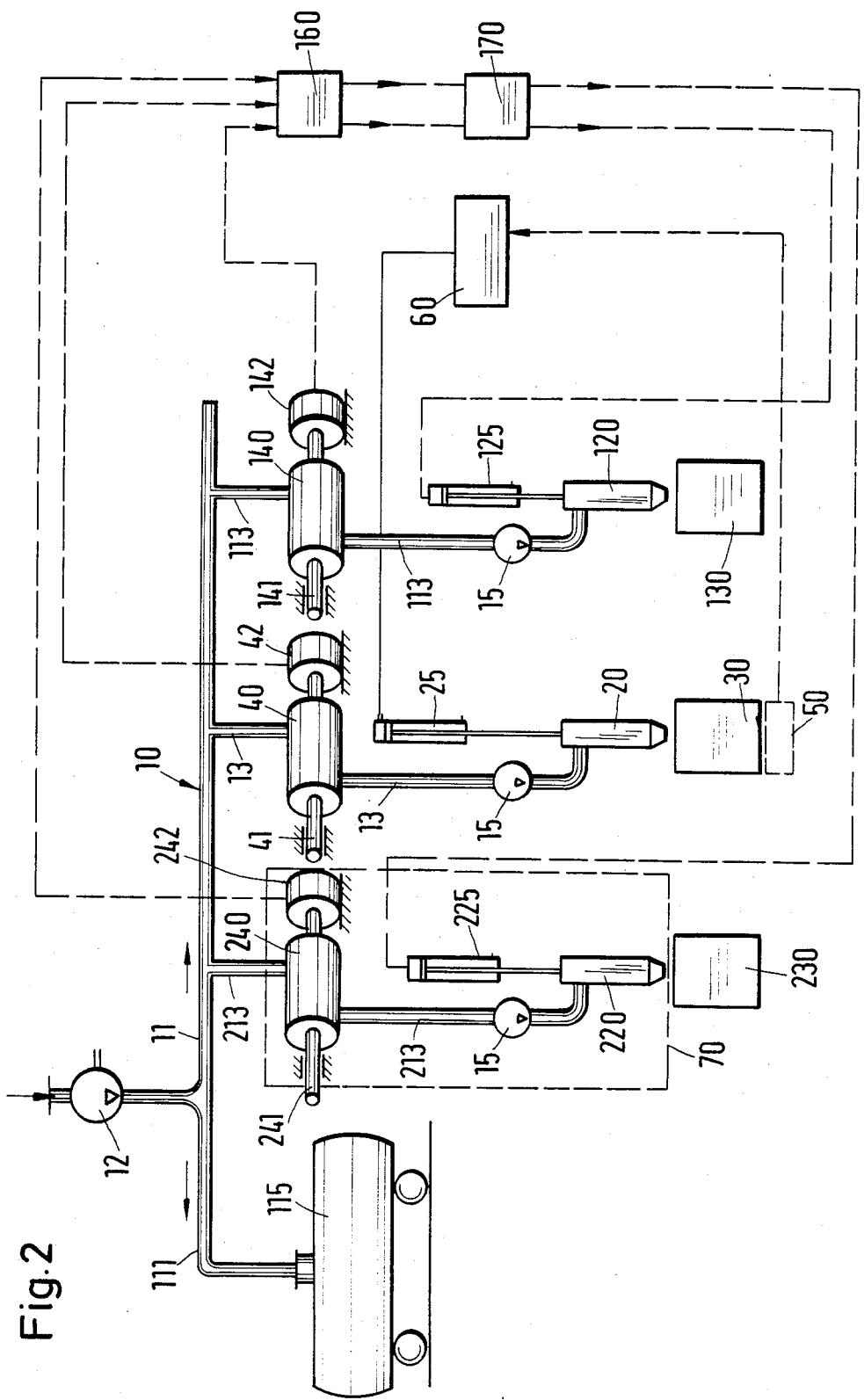

FIG. 2 diagrammatically shows a further embodiment of a filling apparatus with a control means for the filling stations via the flow quantities in the volume chambers in conjunction with a balance.

BEST WAY FOR PERFORMING THE INVENTION

The filling plant according to FIG. 1 comprises a pipeline system 10 comprising a main supply line 11 for the medium to be filled and which contains a feed pump 12, as well as a plurality of further supply lines 13, 113, 213 branching off from the main supply line 11 and which leads to a corresponding number of filling valves 20, 120, 220. The number of filling valves can be chosen at random and depends on the size of the filling apparatus and the number of containers to be simultaneously filled. In the embodiment of the filling apparatus shown in FIG. 1, there are three filling valves. The main supply line 11 is provided with a drawing-off line 111, which leads to a further consuming means, e.g. to a tanker 115.

The operation of the filling valves 20, 120, 220, which are constructed in per se known manner, i.e. the opening, setting and closing takes place by means of an adjusting device 21, which is connected to the filling valves 20, 120, 220 and which is controlled by a two-staged, pneumatic control cylinder 25.

A container 30, 130, 230 to be filled is associated with each filling valve 20, 120, 220. These containers can be barrels, drums, packs, etc, no limits being set with respect to the dimensions of the container to be filled. In place of the container, it is also possible to simultaneously fill in the same way the loading areas of trucks, freighters, etc. Upstream of each filling valve 20, 120, 220 is connected to a volume chamber 40, 140, 240, which are arranged in the supply lines 13, 113, 213 branching off from the main supply line 11 and which lead to the filling valves 20, 120, 220. In the interior of each volume chamber 40, 140, 240 is provided a rotor, not shown in the drawing, which is rotatable in the volume chamber and which is rotated by the medium flowing to the filling valve. The rotors of all the volume chambers 40, 140, 240 are rigidly interconnected by means of a mechanical shaft 41, which is connected to a brake 45, controlled by a system pressure-dependent control device 145, which once again gives the rotational speed of the rotors in the volume chambers 40, 140, 240, so that the same pressure ratios prevail in all the chambers.

The bearing shafts of the rotors of volume chambers 40, 140, 240 can be connected to one another via plug-in connections to shaft 41, so that it is possible to extend an existing filling plant having a certain number of volume chambers with filling valves. To this end, each filling valve with the volume chamber associated therewith is constructed as a standard component 70, so that it is merely necessary to have a connection of the volume chamber to the main supply line 11 to the existing pipeline system 10 and a connection to the adjusting device 21.

A balance 50 constructed in per se known manner is associated with one of the filling valves 20, 120, 220 of the filling apparatus. In the case of the embodiment shown in the drawing, the balance 50 is positioned below the filling valve. Balance 50 is connected to a control element 60 enabling the control cylinder 25 to be controlled.

In the supply line 113 to filling valve 120, with which the balance 50 is associated, is provided a feed pump 15, which supplies the filling valve 120 with the incoming medium at a uniform feed rate.

The filling plant according to FIG. 1 functions as follows. The medium to be filled is fed by means of feed pump 12 through the pipeline system 10 to the filling valves 20, 120, 220. The medium flows out of the filling valves into the containers positioned below the same. Upstream of each filling valve 20, 120, 220, the medium flows through the volume chambers 40, 140, 240 positioned upstream of said valves and whose rotors are rotated by the flowing medium.

Due to the fact that the rotors of the volume chambers 40, 140, 240 associated with the filling valves 20, 120, 220 are interconnected by shaft 41, it is ensured that the same medium quantity is supplied to each valve, within the scope of the precision of the rotors of volume chambers 40, 140, 240 rigidly interconnected by means of shaft 41. The filling valves 20, 120, 220 are set to coarse and fine volumes, as well as opened and closed by means of the two-stage pneumatic control cylinder 25. The precise synchronization during operating, setting and closing of filling valves 20, 120, 220 is produced by the adjusting device 21 between control cylinder 25 and the filling valves.

The pneumatic control cylinder 25 is controlled by means of the control mechanism 60, which responds to the weight of the filled medium via balance 50.

Optionally, and if necessary, a brake 45 can be provided for controlling the system pressure on mechanical shaft 41, which connects the rotors of volume chambers 40, 140, 240. The braking torque is regulated in accordance with the optimum system pressure by means of control mechanism 145.

The filling plant is suitable for the filling of liquid, gaseous or solid substances, whereby the latter must have flow characteristics.

According to a further embodiment of the invention, the rotational speed of shaft 41 and the rotors of the volume chambers 40 140, 240 connected thereto takes place by means of a not shown, regulatable electric motor instead of via brake 45. This regulating motor can also be constructed in pole-changeable manner.

The switching over from coarse feed to fine feed of the medium to be filled via balance 50 takes place by means of the control cylinder 25 controlled by control element 60. This switching over from coarse feed to fine feed is achieved through a given weight, so that on reaching this weight or volume via the fine feed medium is supplied until the desired weight is reached.

The filling plant according to FIG. 2 is constructed in roughly the same way as that according to FIG. 1. The filling plant also comprises a pipeline system 10 comprising a main supply line 11 for the medium to be filled and in which is arranged a feed pump 12, as well as a plurality of further supply lines 13, 113, 213 branching from the main supply line 11 and which lead to a corresponding number of filling valves 20, 120, 220. The number of filling valves can be chosen at random and is dependent on the size of the particular filling apparatus and the number of containers to be simultaneously filled. In the embodiment of a filling plant shown in the drawing, there are three filling valves. The main supply line 11 is provided with a drawing-off line 111, which leads to a further consuming means, e.g. to a tanker 115.

The operation of the filling valves 120, 20, 220 constructed in per se known manner, i.e. the opening, setting and closing takes place by means of pneumatic and advantageously two-stage-functioning control cylinders 25, 125, 225, but it is also possible to provide differently constructed control and drive means for operating the filling valves 20, 120, 220.

With each filling valve 20, 120, 220 is associated a container 30, 130, 230 to be filled. These containers are drums, barrels, packs, etc, no limits being set with regards to the dimensions of the container to be filled. In place of the containers, it is also possible to simultaneously fill in the same way the loading areas of trucks, freighters, etc.

Upstream of each filling valve 20, 120, 220 is connected a volume chamber 40, 140, 240, arranged in the supply lines 13, 113, 213 branching off from the main supply line 11 and leading to valves 20, 120, 220. In the inner area of each volume chamber 40, 140, 240 is provided a rotor (not shown), which is rotatable in the volume chamber by means of bearing shafts (41, 141, 241) and which is rotated by the medium flowing to the filling valve. The rotors of all the volume chambers 40, 140, 240 are correspondingly mounted by means of their bearing shafts 41, 141, 241.

Each bearing shaft 41, 141 or 241 of each rotor of each volume chamber 40, 140 or 240 is connected to a flow rate recording device 42, 142, 242, which determine the quantities of media flowing through chambers 40, 140, 240 and namely via the rotational speed or the number of rotations of the bearing shafts 41, 141, 241 of the individual rotors. Due to the fact that the volume of each volume chamber is fixed and all the chambers have the same volumes, it is possible by means of bearing shafts 41, 141, 241 to determine the values and record the medium quantities flowing through the individual volume chambers.

Each filling valve is constructed with the volume chamber associated therewith as a standard component 70, so that it is only necessary to connect the volume chambers to the main supply line 11 of the existing pipeline system 10, to be able to extend existing plants so as to match the necessary requirements.

A balance 50 constructed in per se known manner is associated with one of the filling valves 20, 120, 220 of the filling plant. In the embodiment of FIG. 2, balance 50 is positioned below the filling valve 20. Balance 50 is connected to a control element 60, which in turn controls the control cylinder 25. By means of balance 50 and control element 60, control cylinder 25 is controlled for the switching on and off of the filling valve 20 associated with container 20. However, it is also possible to control one of the other filling valves 120 or 220 via balance 50.

In the supply line 13 to the filling valve 20 with which the balance 50 is associated, is provided a feed pump 15, which supplies the incoming medium at a uniform feed speed to the filling valve 20.

The flow rate recording devices 42, 142, 242 connected to the volume chambers 40, 140, 240 are used for determining the quantities of media flowing through the volume chambers. All three flow rate recording devices 42, 142, 242 are connected to a device 160 storing the flow rate values determined by said devices. The overall arrangement is such that the flow rate quantity values determined by flow rate recording device 42 is fed as a desired value into memory 160. The flow rate quantity values determined by the flow rate recording devices 142, 242 are also fed as actual values into the memory 160 and are compared therewith the stored flow rate value (desired value) of the flow rate recording device 42. This memory 160 can also have control functions, if no separate control element 170 is provided. The control function comprises when the volume chambers 140, 240 have reached their desired values and which must coincide with the stored desired value of the flow rate recording device 42, filling valves 120, 220 are switched off by means of control cylinders 125, 225. Thus, the latter are connected to the control element 170 or the control part of memory 160.

The filling plant according to FIG. 2 functions as follows. The medium to be filled is fed by means of feed pump 12 through pipeline system 10 to filling valves 20, 120, 220, which are in the open position. From the filling valves, the medium flows into the containers 30, 130, 230 positioned beneath the same. On the way to each filling valve 20, 120, 220, the medium flows through the volume chamber 40, 140, 240 connected upstream of the particular filling valve and whose rotor is rotated by the flowing medium. The quantities flowing through the volume chambers are determined by the flow rate recording devices 42, 142, 242 and the values obtained are fed into memory 160, as will be explained hereinafter. As a result of pressure fluctuations and waves in the pipeline system, it is possible for different medium quantities or volumes to be supplied to the containers 30, 130, 230 via filling valves 20, 120, 220. However, in order to have the same amounts or volumes of the medium in all the containers 30, 130, 230, on reaching a predetermined weight, the control elements 60 of balance 50 brings about a closing of filling valve 20 via the controlled control cylinder 25. Simultaneously, the medium quantity which has flowed through the volume chamber 40 is determined and the flow quantity value is retained in the flow quantity recording device 42 and fed into memory 160 as a desired value. The values detected by the flow rate recording devices 142, 242 for the medium quantities which have flown through the volume chambers 140, 240 are fed into memory 160 as actual values. By means of per se known devices in memory 160, the actual values of the flow rate recording devices 142, 242 are compared with the desired value of the flow rate recording device 42 and if the actual values have reached the desired value, the two control cylinders 125, 225 of filling valves 120, 220 are controlled by element 170 and the filling valves 120, 220 are closed. Thus, no further medium can flow into containers 130, 230. This makes it possible by means of a flow rate quantity value taken from volume chamber 40 and used as a desired value to control the flow rate through the other volume chambers 140, 240 and to close their filling valves 120, 220 at the time at which the medium quantity already detected by the flow rate recording device 42 has flown through volume chambers 140, 240.

If e.g. all three containers 30, 130, 230 are to be filled with a 50 kg filling medium quantity, then prior to reaching the weight of 50 kg, e.g. at 48 kg, filling valve 20 in container 30 is closed via balance 50 using control elements 60. The flow rate quantity of 48 kg determined by the flow rate recording device 42 is fed as a desired value into memory 160, whilst taking account in the flow rate recording device 42 of a quantity difference occurring over the path from volume chamber 40 to filling valve 20. If the flow rate quantity values determined by the flow rate recording devices 142, 242 differ from the 48 kg values stored in memory 160 as a desired value, then controlled by the control element 170, the two filling valves 120, 220 for container 130, 230 remain open until the quantities in volume chambers 140, 240 have reached the desired value in memory 160. If the flow rate values of the flow rate recording devices 142, 242 are below the desired value in memory 160, then via the open filling valves 120, 220 medium flows into containers 130, 230 until the desired value is reached. The flow rate recording devices 142, 242 record the new actual values and feed them into memory 160, where the in each case varying actual values are compared. Control element 170 then brings about the closing of filling valves 120, 220, when the actual values of the flow rate recording devices 142, 242 have reached the stored desired value of the flow rate recording device 42.

Advantageously, balance 50 is set in such a way that the filling valves 20 are closed before the given weight desired value of the balance is reached. This ensures that a higher medium quantity does not flow through the volume chambers 140, 240 to the filling valves 120, 220 and into the containers 130, 230, so as to exceed the predetermined desired weight value of balance 50.

The filling plant according to FIG. 2 is also suitable for filling liquid, gaseous or solid materials, whereby the latter must have flow characteristics.

The switching over from coarses feed to fine feed of the filling medium is brought about by balance 50 via control cylinder 25 controlled by control element 60. This is achieved by a desired value set in the balance (e.g. 48 kg), so that on reaching this desired weight or volume, the fine feed continues to supply medium until the predetermined desired weight value (e.g 50 kg) is determined by balance 50 and the filling valve 20 is closed. The flow rate recording device 42 now records the desired volume value corresponding to the desired weight and which is fed into memory 160. If the flow rate quantity values of the flow rate recording devices 142, 242 are below the desired value in memory 160, then via the open filling valves 120, 220 medium flows into containers 130, 230 until the desired volume value and consequently the desired weight value of 50 kg is reached, so that all the containers 30, 130, 230 are filled with 50 kg of filling medium. Through a corresponding preselection of the switchover point from coarse feed to fine feed, whilst constructing the control cylinders 125, 225 in such a way that they also permit a control from coarse feed to fine feed, it is possible to avoid filling individual containers with more than the desired weight or volume.

It is advantageous if a feed pump 15 is arranged in each of the supply lines 13, 113, 213 leading to the filling valves 20, 120, 220. All the pumps operate synchronously, so that the same inflow rate is obtained for all the filling valves. The feed pump or pumps 15 must have a feed rate, which is slightly above the feed rate of feed pump 12, if a consuming means is connected and being serviced.

We claim:

1. Apparatus for the simultaneous filling of a liquid or solid, flowable medium into several containers, such as drums, barrels, packs or the like, comprising a pipeline system with a feed pump for the supply of the medium to be filled and with filling valves connected by supply lines above the container to be filled, wherein each of the supply lines to the filling valves contains a volume chamber with a rotor arranged in its inner area, each rotor rotated by the medium flowing to the particular filling valve, wherein the rotors of all the volume chambers are rigidly interconnected by means of a mechanical shaft which shaft is connected to a brake controlled by a system pressure-dependent control device, a two-stage, pneumatic control cylinder for controlling the filling valves, the control cylinder directly connected to at least one filling valve and connected to the remaining filling valves via an adjusting device, a control element connected to the control cylinder, the control element responding to the weight of the filled medium via a balance associated with one of the filling valves, the main supply line including a further drawing-off line leading to a consuming means, and a feed pump placed upstream of the filling valve in the supply line leading to the filling valve with the associated balance.

2. Apparatus for the simultaneous filling of a liquid or solid, flowable medium into several containers, such as drums, barrels, packs or the like, comprising a pipeline system with a feed pump for the supply of the medium to be filled and with filling valves connected to supply lines above the container to be filled, wherein each of the supply lines to the filling valves contains a volume chamber with a rotor arranged in its inner area, and including pneumatic two-stage control cylinders connected to the filling valves, and a plurality of flow rate recording devices connected to the volume chambers, a control element connected to one of said control cylinders, the control element, responding to the weight of the filled medium via a balance associated with one of said filling valves, wherein a first of the flow rate recording devices associated with the volume chamber with the filling valve controlled by the balance is connected to a device storing as a desired value the quantity of medium which has flowed through as determined on switching off the medium supply to the filling valve and which is detected by the first flow rate recording device, wherein the remaining flow rate recording devices of the other volume chambers are brought together in the storing device and the desired values of the first flow rate recording device is compared in the storing device with the actual values of the other flow rate recording devices for controlling the remaining filling valvs and on reaching the desired values for the volume chambers, the filling valves associated therewith are switched off, and the main supply line including a further drawing-off line leading to a consuming means, and a feed pump placed upstream of the filling valve in the supply line leading to the filling valve associated with the balance.

3. Apparatus according to claims 1 or 2, wherein a feed pump is provided in each of the supply lines leading to the filling valves.

4. Apparatus according to claim 3, wherein the feed pumps in the supply lines operate synchronously.

5. Apparatus according to claim 4, wherein the feed rate of the feed pumps in the supply lines is slightly above the feed rate of the feed pump in the pipeline system.

* * * * *